US008675745B2

(12) United States Patent
Jallon

(10) Patent No.: US 8,675,745 B2
(45) Date of Patent: Mar. 18, 2014

(54) METHOD FOR DETECTING AN OFDM SIGNAL

(75) Inventor: Pierre Jallon, Grenoble (FR)

(73) Assignee: Commissariat a l'Energie Atomique, Paris (FR)

( * ) Notice: Subject to any disclaimer, the term of this patent is extended or adjusted under 35 U.S.C. 154(b) by 629 days.

(21) Appl. No.: 12/473,899

(22) Filed: May 28, 2009

(65) Prior Publication Data

US 2009/0296841 A1 Dec. 3, 2009

(30) Foreign Application Priority Data

May 30, 2008 (FR) ...................... 08 53552

(51) Int. Cl.
*H04K 1/10* (2006.01)
*H04L 27/28* (2006.01)

(52) U.S. Cl.
USPC ........................................................ 375/260

(58) Field of Classification Search
USPC ............... 375/346, 267, 150, 260; 455/456.1, 455/251.1, 522
See application file for complete search history.

(56) References Cited

U.S. PATENT DOCUMENTS

| | | | |
|---|---|---|---|
| 3,656,162 A * | 4/1972 | Mee ............................... | 370/339 |
| 6,426,983 B1 * | 7/2002 | Rakib et al. .................... | 375/346 |
| 8,160,163 B1 * | 4/2012 | Yucek et al. .................... | 375/260 |
| 2007/0223608 A1 * | 9/2007 | Nakayama et al. ........... | 375/260 |

FOREIGN PATENT DOCUMENTS

| | | |
|---|---|---|
| EP | 1 655 872 A1 | 5/2006 |
| WO | WO 2007/050482 A2 | 5/2007 |

OTHER PUBLICATIONS

Chen, Spectrum Sensing Using Cyclostationary Properties and Application to IEEE 802.22 WRAN, 2007, IEEE GLOBECOM.*
Chen et al., Spectrum Sensing Using Cyclostationary Properties and Application to IEEE 802.22 WRAN, 2007, IEEE.*
Dan Zhang, et al., "Interference Cancellation for OFDM Systems in Presence of Overlapped Narrow Band Transmission System", IEEE Transactions on Consumer Electronics, vol. 50, No. 1, Feb. 2004. pp. 108-114.
William A. Gardner, et al., "Cyclostationarity: Half a century of research", Signal Processing, Elsevier, vol. 86, No. 4, 2006. pp. 639-697.
Hiroyuki Ishii, et al., "OFDM Blind Parameter Identification in Cognitive Radios", IEEE 16th International Symposium on Personal, Indoor and Mobile Radio Communications, Sep. 2005. pp. 700-705.
Joseph Mitola III, "Cognitive Radio: An Integrated Agent Architecture for Software Defined Radio", Royal Institute of Technology, Teleinformatics, Electrum 204, May 8, 2000. 157 pages.

(Continued)

*Primary Examiner* — Chieh M Fan
*Assistant Examiner* — Wednel Cadeau
(74) *Attorney, Agent, or Firm* — Oblon, Spivak, McClelland, Maier & Neustadt, L.L.P.

(57) ABSTRACT

A method for detecting the presence of an OFDM signal in a received signal wherein said received signal is down converted into baseband and subjected to a passband filtering corresponding to a band of interest before being sampled. The thus sampled signal is subjected to a second filtering for eliminating at least one interfering line in the band of interest. The presence of an OFDM signal is detected if the signal filtered by the second filtering is cyclostationary.

6 Claims, 4 Drawing Sheets

(56) References Cited

OTHER PUBLICATIONS

Carlos Cordeiro, et al., "IEEE 802.22: An Introduction to the First Wireless Standard based on Cognitive Radios", Journal of Communications, vol. 1, No. 1, Apr. 2006. pp. 38-47.

Peng Liu, et al., "A Blind Time-parameters Estimation Scheme for OFDM in Multi-path Channel", National Key Lab. Of ISN, IEEE, 2005. pp. 222-227.

Sparano, David, "What Exactly is 8-VSB Anyway?" 14 pgs.

* cited by examiner

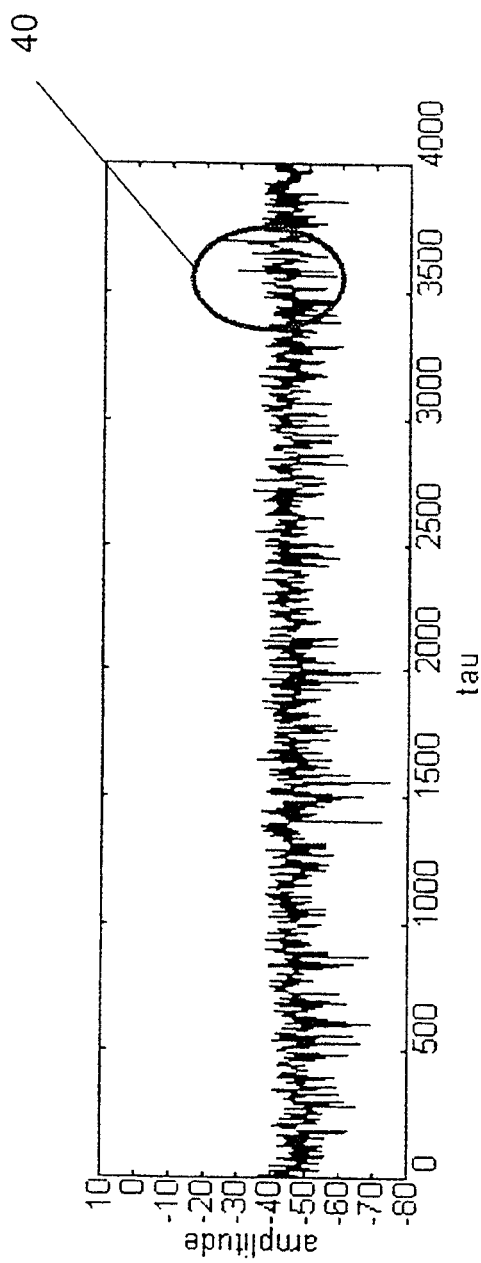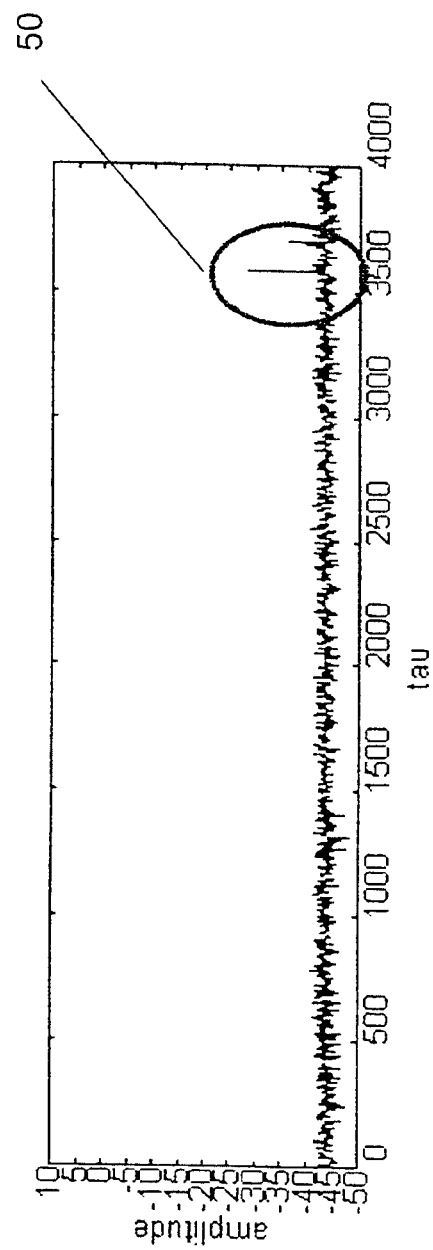

METHOD FOR DETECTING AN OFDM SIGNAL

TECHNICAL FIELD

The present invention relates to the field of OFDM signal presence detection. It can be used in particular in cognitive radio systems.

PRIOR ART

Increasing levels of spectrum congestion have prompted the consideration of telecommunication systems capable of co-existing with already assigned, so-called primary frequency band systems. Two strategies for co-existence are currently the subject of major research. The first comprises using a very weak signal level through a very wide spectrum spread, and this is the path followed by ultra wide band systems otherwise known as UWB. The second comprises using cognitively a part of the spectrum which is specifically or temporarily unoccupied, and this is the path followed by so-called cognitive radio. A description of cognitive radio will be found in the ground-breaking thesis by J. Mitola entitled "Cognitive radio: an integrated agent architecture for software defined radio", Royal Institute of Technology, Stockholm, PhD Dissertation, 8 May 2000.

The cognitive radio principle has in particular been adopted for the development of long-range wireless networks known as WRAN (Wireless Regional Area Network). These networks are currently subject to a standardisation process within the IEEE 802.22 working group. To be more precise, this standard in course of development proposes using vacant UHF and VHF bands cognitively to make a point-to-point wireless transmission in a WRAN network. It is in particular foreseen to use cognitively the UHF bands assigned to the DVB-T (Digital Video Broadcast-Terrestrial) television system. The DVB-T standard uses an OFDM (Orthogonal Frequency Division Multiplexing) modulation to transmit compressed video/audio flows. An introduction to IEEE standard 802.22 will be found in the article by C. Cordeiro et al. entitled "IEEE 802.22: an introduction to the first wireless standard base on cognitive radios", published in Journal of Communications, Vol. 1, N°1, April 2006, pp. 38-47.

Before being able to transmit on a given UHF band, a WRAN network transmitter has to be able to determine whether an OFDM signal is present on said band, and where appropriate, to estimate the time parameters thereof such as the length of the prefix, the useful length or total length of the OFDM symbol.

The article by P. Liu et al. entitled "A blind time-parameters estimation scheme for OFDM in multi-path channel" published in Proc. 2005 Int'l Conference on Wireless Communications Networking and Mobile Computing, 23-26 Sep. 2005, Vol. 1, pp. 242-247 describes a method for the detection of the presence of an OFDM signal and for the blind estimation of its time parameters, by calculating a correlation function for a plurality of correlation lengths. Blind estimation is taken to mean that the cognitive terminal has no a priori knowledge of the time parameters of the OFDM signal.

However, OFDM signal detection and the subsequent estimation of the time parameters thereof can be erroneous in the presence of an interference signal in the frequency band of interest. The cognitive terminal may thus wrongfully conclude that an OFDM signal is present and refrain to transmit on a band that is nonetheless available. Conversely, the terminal may wrongly conclude that no cognitive signal is present and so transmit on a band occupied by the primary system, with the risks of interference that such transmission may cause.

A first object of the present invention is to propose a method for determining with increased reliability whether an OFDM signal is present on or absent from a frequency band of interest and to do so, even where an interference signal is present in said band.

DISCLOSURE OF THE INVENTION

The present invention is defined by a method for detecting the presence of an OFDM signal in a received signal, according to which said received signal is frequency down-converted to baseband and subject to passband filtering corresponding to a band of interest before being sampled. The signal so sampled is subject to a second filtering intended to eliminate at least one interfering line in the band of interest and the presence of an OFDM signal is detected if the signal filtered by the second filtering is cyclostationary.

To determine the interfering line or lines, the spectral density of the sampled signal is advantageously calculated, the mean value m and the variance $\sigma^2$ of said spectral density is then determined, and a determination is then made of the points on the spectrum whereof the amplitude is greater than $m+\lambda\sigma^2$, where $\lambda$ is greater than 1.

According to a first alternative, the second filtering is a passband filtering that eliminates the interfering line or lines.

According to a second alternative, the second filtering is a band-stop filtering that eliminates the interfering line or lines.

The elementary transfer functions of the different band-stop filters are obtained by determining for each point x of the spectrum whereof the spectral density value exceeds $m+\lambda\sigma^2$, the first point to the right thereof, $x^+=x+\epsilon_d$, and the first point to the left thereof $x^-=x-\epsilon_g$ whereof the spectral density value is equal to m, the corresponding elementary transfer function being adapted to reject the frequency band $[x^-x^+]$.

According to a third alternative, the second filtering includes a step of decimating said sampled signal.

According to a first embodiment of the detection method, the autocorrelation function $Rs_a(t,\tau)$ of the signal filtered by the second filtering is calculated and the value $\tau_{max}$ of the time interval corresponding to the autocorrelation function maximum is determined, the presence of an OFDM signal being detected if $Rs_a(t,\tau_{max})$ displays a time periodicity.

A determination is then made as to whether $Rs_a(t,\tau_{max})$ displays a time periodicity by performing a Fourier transform of the signal filtered by the second filtering and by comparing the amplitude of a fundamental line of the spectrum obtained against a preset threshold value.

According to a second embodiment of the detection method, the coefficients of cyclical correlation $\rho_a^{k/(\alpha+\beta)}(\tau)$ of the signal filtered by the second filtering are calculated where $$\frac{k}{\alpha+\beta}, k \in Z$$

are the cyclical frequencies and $\tau$ is a time interval, and then a discrimination function $$J(\alpha, \beta) = \sum_{k=0}^{K-1} |\rho_a^{k/(\alpha+\beta)}(\alpha)|^2$$

is calculated where K is a whole value strictly greater than 1.

The presence of an OFDM signal is detected if the autocorrelation function maximum $(J(\hat{\alpha},\hat{\beta}))$ is above a preset threshold $(J_0)$.

BRIEF DESCRIPTION OF THE DRAWINGS

Other characteristics and advantages of the invention will become clear from reading a preferential embodiment of the invention given with reference to the appended figures among which:

FIG. 4 shows the processing of the signal in FIG. 1 by a first detection method;

FIG. 5 shows the processing of the signal in FIG. 1 by a second detection method.

DETAILED DISCLOSURE OF PARTICULAR EMBODIMENTS

We will consider hereinafter a cognitive radio system terminal wishing to determine whether an OFDM signal is present on or absent from a frequency band of interest.

The terminal concerned may for example be a WRAN network transmitter searching for an available band in the DVB-T spectrum. It will be remembered that the DVB-T spectrum used by TNT (Terrestrial Digital Television) uses UHF channels 21 to 69 (occupying the spectral band from 470 to 862 MHz), each channel having a bandwidth of 8 MHz.

When the cognitive terminal wishes to determine whether a band of interest, i.e. in the previous example, one of the UHF channels, is occupied by an OFDM signal, the cognitive terminal demodulates the signal received at the central frequency of the band of interest, i.e. at the corresponding frequency of the channel in the aforementioned example. The signal so transposed into baseband is then filtered using a passband filter corresponding to the width of the band of interest (−4MHz to +4MHz for one of the UHF channels), and then sampled at the Nyquist frequency of the signal so filtered (for example 8 Mhz).

While prior art detection methods seek whether the signal so obtained displays cyclostationarity, in other words whether the autocorrelation function of said signal displays periodicity, the present invention applies a specific filtering before proceeding to said search.

To be more precise, said specific filtering may be passband filtering, band rejection filtering, or else be obtained by decimating the sampled signal.

Surprisingly, it has been noted, that the fact of employing passband or band rejection filtering to eliminate one or more interfering lines within the band of interest was not significantly detrimental to the cyclostationarity properties of the OFDM signal. Eliminating the interfering lines appreciably reduces the probability of an OFDM signal being falsely detected (said signal being detected when it is in fact absent, or said signal not being detected when it is actually present) while substantially retaining the cyclostationarity properties thereof. Furthermore, if the detection step concludes that an OFDM signal is present in the band of interest, the time parameters can be estimated with increased reliability from the signal that has been subject to said specific filtering.

Figure 1:
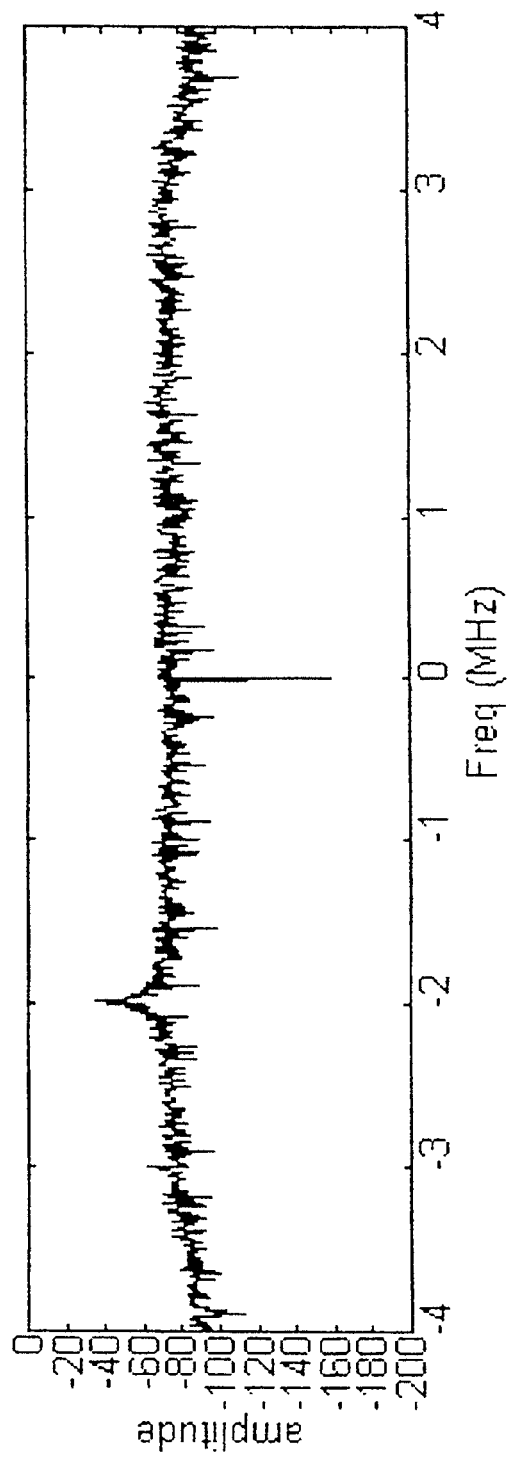
FIG. 1 shows a spectrum example of a DVB-T signal transposed into baseband.

FIG. 1 shows a typical example of the spectrum of a DVB-T signal on a UHF channel, down converted into baseband. The spectrum extends from −4 MHz to +4 MHz and comprises an interference signal line at −2 MHz. Said line may be due for example to an analogue TV signal.

Figure 2:
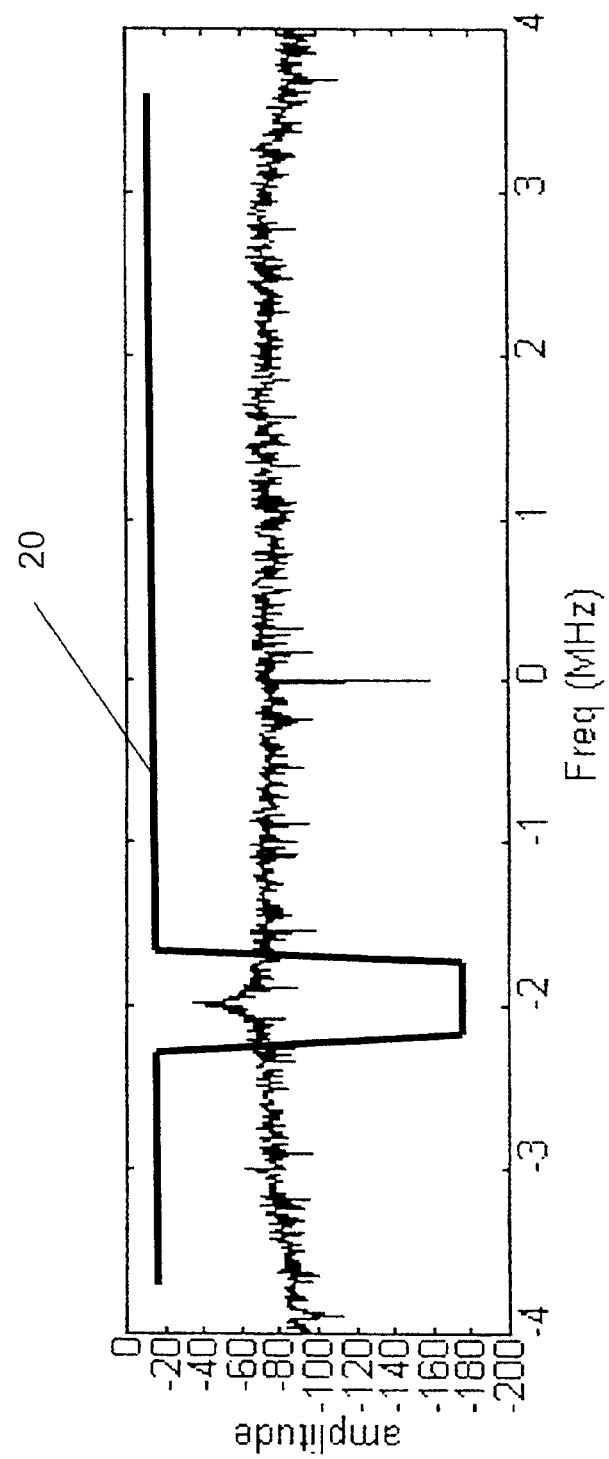
FIG. 2 shows a first example of specific filtering of the signal in FIG. 1, prior to a search for cyclostationarity.

FIG. 2 shows diagrammatically a first example of the specific filtering of the signal in FIG. 1. The filter is in this case a band-stop or frequency rejection filter, centred on the interfering line. The transfer function of the filter is indicated by the reference number 20. If a plurality of interfering lines is present, the different interfering lines concerned may be rejected.

Figure 3:
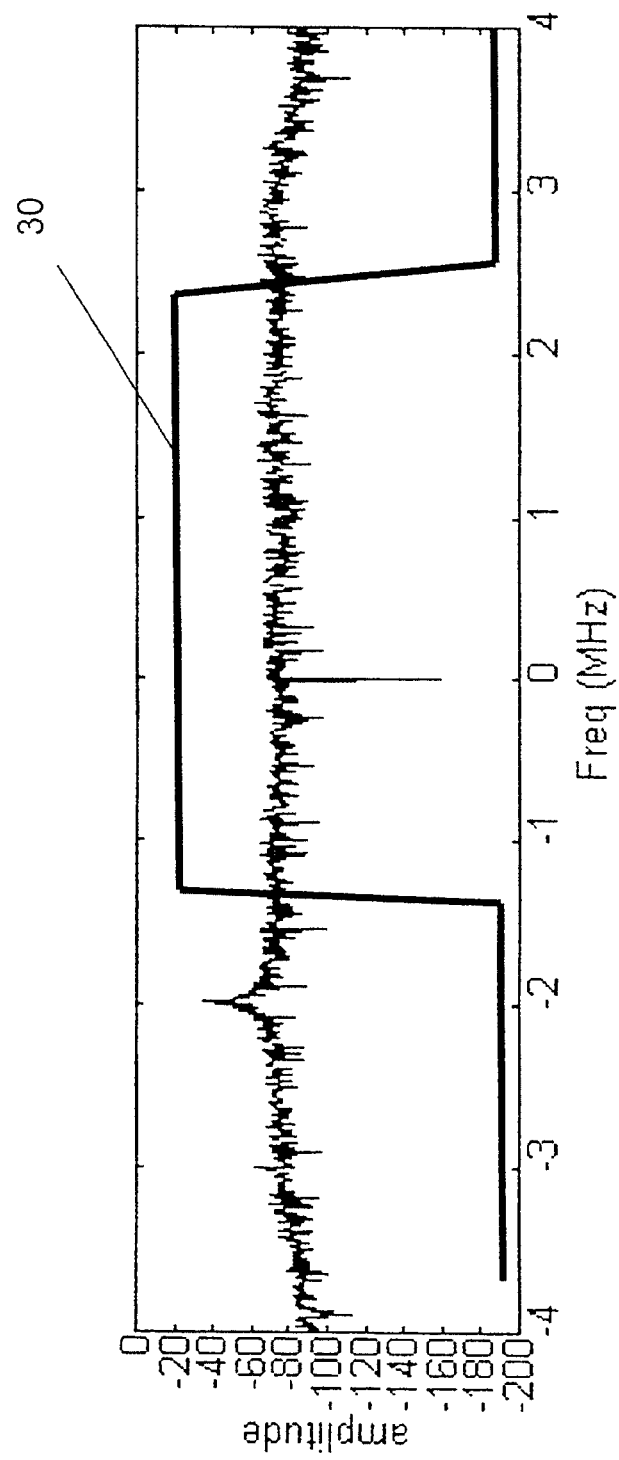
FIG. 3 shows a second example of specific filtering of the signal in FIG. 1, prior to a search for cyclostationarity.

FIG. 3 shows diagrammatically a second example of the specific filtering of the signal in FIG. 1. The filter is in this case a passband filter that eliminates the interfering line. In practice for DVB-T signals, it will be noticed that the interfering lines are located between −3 MHz and −2 MHz. Advantageously, a passband filter is then used with the passband thereof extending from −1.5MHz to 2.5 MHz, as indicated by the transfer function 30.

If a plurality of interfering lines is present, a passband filter is selected that keeps only the signal spectrum part unaffected by these interfering lines.

Generally speaking, if the cognitive terminal knows the frequencies of the interfering lines, these lines will be rejected by a band-stop filter or filters or, alternatively, the signal down converted into baseband will be filtered by a passband filtering that eliminates them.

Where the interfering lines are not known a priori, the terminal may determine their spectral positions by proceeding as follows:

Initially, the spectral power density of the sampled signal down converted into baseband is estimated, by Fourier transform (FFT) for example whereof the squared modulus is then calculated.

The mean and variance of the modulus of this spectral density is m and $\sigma^2$, respectively.

A search is then made for the points in the spectrum for which the spectral density value is greater than the value $m+\lambda\sigma^2$ where $\lambda$ is an actual greater than 1, for example equal to $\lambda=3$. Let S be all the points on this list.

For each point $x \in S$, the first point to the right $x^+=x+\epsilon_d$ is determined as is the first point to the left $x^-=x-\epsilon_g$ whereof the spectral density value is equal to m.

According to a first alternative, a passband filter is then selected which eliminates the frequencies $$\bigcup_{x \in S} [x^- x^+].$$

According to a second alternative, for each frequency $x \in S$, the transfer function $H_x$ of a filter rejecting the band $[x^- x^+]$ is determined and a transfer function band-stop filter $$\prod_{x \in S} H_x$$

is in fact used.

According to a third alternative, as an option to passband or band-stop filtering, filtering by sampled signal decimation may be carried out. A suitable choice of decimation rate will then be made to eliminate the interfering lines. For example, if the baseband signal is in the [−4 MHz 4 MHz] band and has been sampled at the Nyquist frequency (8 MHz), and if the interfering line has been determined as being at −2 MHz, a decimation rate of 4 will be selected. The sampled signal so decimated is then in the [−1 MHz 1 MHz] band and no longer satisfies the Nyquist criterion. However, the folding of the interfering line due to sub sampling (aliasing) occurs onto the zero frequency. Generally speaking if the interfering line is found at $\pm f_{int}$ in the band [−B,+B] of the signal in baseband sampling will be performed at the frequency $f_{int}$, i.e. decimation filtering will be performed at the rate $2B/f_{int}$ to obtain in fact a signal in the band $[-f_{int},+f_{int}]$.

Folding the interfering line images onto the zero frequency does not affect the cyclostationarity properties of the signal.

The OFDM signal is detected based on the cyclostationarity properties of the filtered signal. To be more precise, the presence of an OFDM signal in the band of interest will be detected if said signal filtered, and therefore devoid of interfering lines, is cyclostationary.

The filtered signal autocorrelation function can be expressed in the form:

$$Rs_a(t,\tau) = E\{1(t)s_a^*(t-\tau)\} \quad (1)$$

where $E\{.\}$ denotes the expected value, $s_a(t)$ the filtered signal and $\tau$ the time interval in respect of which the correlation is calculated.

According to a first detection method, the value $\tau_{max}$ of the time interval corresponding to the maximum, possibly standardised, autocorrelation function $Rs_a(t,\tau)$ is sought. If an OFDM signal is present in the received signal, it may be shown that the value $\tau_{max}$ corresponds to the usable signal duration of the OFDM symbol. $Rs_a(t,\tau_{max})$ is then a periodic function in t and of periodicity equal to the length $T_s$ of the OFDM symbols. The $Rs_a(t,\tau_{max})$ spectrum is therefore a spectrum of lines spaced apart by $1/T_s$, the fundamental line being located at $1/T_s$. The first detection method determines the presence of an OFDM signal if a periodicity exists in $RS_a(t,\tau_{max})$ or, if the amplitude of the fundamental line in the $Rs_a(t,\tau_{max})$ spectrum exceeds a preset threshold.

The second detection method was disclosed in detail in patent application no. 07 55394 filed on 31 May 2007 by the present Applicant and the main aspects of which are restated below.

According to this method, a calculation is made of the coefficients of cyclical correlation $\rho_a^{k/(\alpha+\beta)}(\tau)$ defined by:

$$\rho_a^{k/(\alpha+\beta)}(\tau) = \lim_{T\to\infty} \frac{1}{T}\int_0^T Rs_a(t,\tau)e^{-2i\pi\frac{kt}{\alpha+\beta}} = \left\langle Rs_a(t,\tau)e^{-2i\pi\frac{kt}{\alpha+\beta}} \right\rangle_t \quad (2)$$

where the $$\frac{k}{\alpha+\beta}, k \in Z$$

are the cyclical frequencies and $\langle\cdot\rangle_t$ denotes the time mean. The autocorrelation function then breaks down as follows:

$$Rs_a(t,\tau) = \sum_k \rho_a^{k/(\alpha+\beta)}(\tau)e^{2i\pi\frac{kt}{\alpha+\beta}} \quad (3)$$

A discrimination function is defined by:

$$J(\alpha,\beta) = \sum_{k=0}^{K-1} |\rho_a^{k/(\alpha+\beta)}(\alpha)|^2 \quad (4)$$

where K is a whole value strictly greater than 1, indicating the number of cyclical frequencies taken into consideration in the estimation. Said discrimination function makes it possible to determine whether, for a given time interval $\tau=\alpha$, the autocorrelation function shows as a function of the time peaks that repeat with a periodicity $\alpha+\beta$.

In the presence of an OFDM signal with time parameters $T_u$ and $T_s=T_u+T_p$, where $T_u$ is the useful duration, $T_p$ the duration of the prefix and $T_s$ the duration of the OFDM symbols, the discrimination function $J(\alpha,\beta)$ will show a maximum J for $\alpha=T_u$ and $\beta=T_p$. Said maximum will be substantially greater than the maximum $J_0$ which will be attained by the function $J(\alpha,\beta)$ in the absence of an OFDM signal.

Generally speaking, the presence of an OFDM signal will be detected if there is a pair of values $\alpha$ and $\beta$ such that $J(\alpha,\beta) > J_0$.

It will be noted that unlike with the first detection method which proceeds in two successive steps, firstly estimating the useful length $T_u$ and then the total length $T_s$ of the OFDM symbols, the second detection method operates jointly on these two parameters and is, for this reason, more resistant to noise.

In practice, the coefficients of cyclical correlation are calculated on a finished window length U, based on the sampled signal, i.e.:

$$\rho^{k/(\tilde\alpha+\tilde\beta)}(\tilde\alpha) = \frac{1}{U}\sum_{u=0}^{U-1} s_a(u)s_a^*(u-\tilde\alpha)e^{-2i\pi\frac{k}{\tilde\alpha+\tilde\beta}} \quad (5)$$

wherein the reduced values $$\tilde\alpha = \frac{\alpha}{T_e} \text{ and } \tilde\beta = \frac{\beta}{T_e}$$

where $T_e$ is the sampling period, have been defined.

It will be noted that if the sampled signal is decimated, $T_e$ is the sampling period after decimation. Decimation does not modify the position of the $Rs_a(t,\tau_{max})$ lines in as much as $\tau_{max} \gg T_e$.

The discrimination function is deduced from the expression (4), i.e.:

$$J(\tilde\alpha,\tilde\beta) = \sum_{k=0}^{K-1}\left|\frac{1}{U}\sum_{u=0}^{U-1} s_a(u)s_a^*(u-\tilde\alpha)e^{-2i\pi\frac{k}{\tilde\alpha+\tilde\beta}}\right|^2 \quad (6)$$

or, in an equivalent way, by simple translation of α:

$$J(\tilde{\alpha}, \tilde{\beta}) = \sum_{k=0}^{K-1} \left| \frac{1}{U} \sum_{u=0}^{U-1} s^*(u) s(u+\tilde{\alpha}) e^{-2i\pi \frac{k}{\tilde{\alpha}+\tilde{\beta}}} \right|^2 \quad (7)$$

A determination is then made of parameters $\hat{\alpha}$ and $\hat{\beta}$ which maximise the discrimination function. It is concluded that an OFDM signal is present if:

$$J(\hat{\alpha}, \hat{\beta}) > J_0 \quad (8)$$

and, if not, that said signal is absent.

The value of the threshold $J_0$ may be determined empirically from discrimination function maxima observed for OFDM signals with different signal-to-noise ratios.

In FIG. 4 has been shown the $Rs_a(t, \tau_{max})$ spectrum obtained according to the first detection method, after elimination of the interfering line at −2 MHz of the signal shown in FIG. 1. A first peak towards 3520 (in sample numbers) can be seen to appear (see encircled area 40) emerging from the noise.

Similarly in FIG. 5 the discrimination function $J(\alpha,\beta)$ has been obtained according to the second detection method, as a function of $\alpha+\beta$ for $\alpha=\hat{\alpha}$. A peak towards 3500 (sample number) can be seen clearly to appear (see encircled area 50) emerging from the noise.

In both cases, it may be concluded that an OFDM signal of symbol time corresponding to $3500.T_e$ is present in the band of interest.

The invention claimed is:

1. A method for detecting a presence of an OFDM signal, said method comprising:
   obtaining a signal;
   subjecting said signal to a frequency down converting into baseband, passband filtering corresponding to a band of interest before being sampled, and then sampling to generate a sampled signal;
   determining interfering line(s) by calculating a spectral density of the sampled signal, a mean value m and a variance $\sigma^2$ of this spectral density, and obtaining points on the spectrum for which the spectral density is greater than $m+\lambda\sigma^2$, where $\lambda$ is greater than 1;
   obtaining elementary transfer functions of a set of band-stop filters by determining for each point x in the spectrum whereof the spectral density value exceeds $m+\lambda\sigma^2$, the first point to the right thereof, $x^+=x+\epsilon_d$, and the first point to the left thereof $x^-=x-\epsilon_g$ for which the spectral density value is equal to m, the corresponding elementary transfer function being adapted to reject the frequency band $[x^-x^+]$;
   subjecting the thus sampled signal to a second filtering by using said set of band-stop filters for eliminating the interfering line(s) in the band of interest; and
   detecting the presence of an OFDM signal by checking whether the signal filtered by the second filtering is cyclostationary.

2. The method as claimed in claim 1, further comprising:
   calculating an autocorrelation function $Rs_a(t,\tau)$ of the sampled signal filtered by the second filtering, with $\tau$ being a time interval in which correlation is calculated and t is time;
   determining a value $\tau_{max}$ of a time interval corresponding to a maximum autocorrelation function; and
   detecting the presence of the OFDM signal in response to $Rs_a(t,\tau_{max})$ including a time periodicity.

3. The method as claimed in claim 1, further comprising:
   calculating coefficients of cyclical correlation of the sampled signal filtered by the second filtering; and
   then calculating a discrimination function.

4. The method as claimed in claim 2, further comprising:
   determining that the $Rs_a(t,\tau_{max})$ includes a time periodicity by performing a Fourier transform of the sampled signal filtered by the second filtering and by comparing an amplitude of a fundamental line of a $Rs_a(t,\tau_{max})$ spectrum against a preset threshold value.

5. The method as claimed in claim 3, wherein the presence of the OFDM signal is detected in response to a maximum of the discrimination function being above a preset threshold.

6. A method for detecting a presence of an OFDM signal, said method comprising:
   obtaining a signal;
   subjecting said signal to a frequency down converting into baseband, passband filtering corresponding to a band of interest before being sampled, and then sampling to generate a sampled signal;
   determining interfering line(s) by calculating a spectral density of the sampled signal, a mean value m and a variance $\sigma^2$ of this spectral density, and obtaining points on the spectrum for which the spectral density is greater than $m+\lambda\sigma^2$, where $\lambda$ is greater than 1;
   obtaining elementary transfer functions of a set of band-stop filters by determining for each point x in the spectrum whereof the spectral density value exceeds $m+\lambda\sigma^2$, the first point to the right thereof, $x^+=x+\epsilon_d$, and the first point to the left thereof $x^-=x-\epsilon_g$ for which the spectral density value is equal to m, the corresponding elementary transfer function being adapted to reject the frequency band $[x^-x^+]$;
   subjecting the thus sampled signal to a second filtering by using said set of band-stop filters for eliminating the interfering line(s) in the band of interest;
   calculating an autocorrelation function $Rs_a(t,\tau)$ of the sampled signal filtered by the second filtering, with $\tau$ being a time interval in which correlation is calculated and t is time;
   determining a value $\tau_{max}$ of a time interval corresponding to a maximum autocorrelation function; and
   detecting the presence of the OFDM signal in response to $Rs_a(t,\tau_{max})$ being determined to be a periodic function in t with a periodicity equal to a length of OFDM symbols, wherein the detecting includes determining that the $Rs_a(t,\tau_{max})$ includes the time periodicity by performing a Fourier transform of the sampled signal filtered by the second filtering and by comparing an amplitude of a fundamental line of a $Rs_a(t,\tau_{max})$ spectrum against a preset threshold value.

* * * * *